United States Patent [19]

Hawkes et al.

[11] Patent Number: 5,717,322
[45] Date of Patent: Feb. 10, 1998

[54] METHOD TO IMPROVE THE PEAK-CURRENT LIMIT IN A SLOPE-COMPENSATED, CURRENT-MODE DC/DC CONVERTER, AND CIRCUIT THEREFOR

[75] Inventors: Charles Edward Hawkes, Cary; Michael Mark Walters, Raleigh; Robert George Hodgins, Durham, all of N.C.

[73] Assignee: Harris Corporation, Palm Bay, Fla.

[21] Appl. No.: 602,287

[22] Filed: Feb. 16, 1996

[51] Int. Cl.$^6$ .......................... H02M 3/335; G05F 1/46
[52] U.S. Cl. .................................. 323/283; 323/286
[58] Field of Search ........................ 363/21, 17, 98, 363/132; 323/282–286

[56] References Cited

U.S. PATENT DOCUMENTS

| | | | |
|---|---|---|---|
| 4,772,996 | 9/1988 | Hanei et al. | 363/41 |
| 4,837,495 | 6/1989 | Zansky | 323/222 |
| 4,866,588 | 9/1989 | Rene | 363/21 |

*Primary Examiner*—Peter S. Wong
*Assistant Examiner*—Rajnikant B. Patel
*Attorney, Agent, or Firm*—Allen, Dyer, Doppelt, Milbrath & Gilchrist, P.A.

[57] ABSTRACT

A method and circuit for modifying the clamping level (VCLAMP) of the error signal voltage (VERROR), which clamp in turn limits the peak current in the inductor of a slope-compensated, current mode DC/DC converter. VCLAMP may be modified and/or variable such that it is a function of average current in the inductor, peak current in the inductor, the converter duty cycle and/or the level of slope compensation used in the converter. The modification of VCLAMP may result in the peak current limit being independent of the converter duty cycle and/or the level of slope compensation used in the converter. Further, the modification of VCLAMP does not compromise the operational stability of the converter which is achieved by the use of a slope compensation. In addition, the clamping of the error signal before slope compensation rather than after slope compensation avoids instability at high duty cycles.

34 Claims, 4 Drawing Sheets

METHOD TO IMPROVE THE PEAK-CURRENT LIMIT IN A SLOPE-COMPENSATED, CURRENT-MODE DC/DC CONVERTER, AND CIRCUIT THEREFOR

FIELD OF THE INVENTION

The invention relates to DC/DC converters and methods of operation thereof.

BACKGROUND OF THE INVENTION

A DC/DC converter may be a buck converter, half wave convertor, full wave converter or forward converter in which a high side switch is operated to supply current to a series inductor and shunt capacitor which supply current to a load. Generally, the duty cycle of the high side switch is varied in response to the current requirements of the load and unless the rating of the components is excessive, some mechanism must be employed to limit the peak current in the inductor and thereby protect the circuit components.

In a converter without slope compensation, the current in the inductor for each cycle may be controlled by an error signal VERROR derived from a comparison of the actual with the desired load voltage. FIG. 1 is a graph showing VERROR, the sensed current in the inductor and the average inductor or load current. Exemplary peak currents in the inductor are indicated by reference numeral 80 in FIG. 1.

During each saw-tooth cycle of converter operation, current may be applied to the inductor until it reaches VERROR. When current in the inductor reaches the level of VERROR, the high side switch is opened to discontinue the application of current to the inductor, permitting the current therein to ramp down until a clock signal starts a new cycle of current application by closing the high side switch.

For an increasing load, VERROR may increase as shown in the beginning portion of the graph in FIG. 1 without any change in the waveform or duty cycle of the applied current. To protect the converter from a destructive overcurrent condition, VERROR may be clamped by a clamping signal VCLAMP as shown in FIG. 1. VCLAMP provides an upper limit for VERROR, and thereby provides a peak current limit for the current in the inductor.

When VERROR attains the level of VCLAMP, and can go no higher, the converter is said to be in current limit as shown in FIG. 1. VCLAMP is desirably set at a predetermined level that may ensure the safe operation of the converter.

The operation of a converter as illustrated by the graph of FIG. 1 is stable so long as the duty cycle of the converter is such that current is applied to the inductor less than 50% of the time. For duty cycles of 50% or more, it may be necessary to subtract a slope compensation signal from the error signal to ensure safe and stable operation of the converter.

FIG. 2 is a graph which illustrates the operation of a slope-compensated DC/DC converter. In FIG. 2, a saw-toothed slope compensation signal VSLOPE may be subtracted from VERROR to produce a slope-compensated error signal VCOMP having a voltage equal to VERROR−VSLOPE. Note that VERROR may have been clamped prior to the subtraction of VSLOPE to produce VCOMP.

In the slope-compensated converter, the current in the inductor may ramp up at the beginning of each duty cycle until it reaches VCOMP, at which time the high side switch opens to discontinue current application to the inductor. The current in the inductor may then ramp down until a clock signal restarts the cycle.

It will be apparent from a comparison of FIGS. 1 and 2 that, as a result of slope compensation, the peak current in the inductor is noticeably lower at the point the slope-compensated converter enters current limit, i.e., where VERROR=VCLAMP. As the load on the slope-compensated converter is increased after the converter enters current limit, the peak current in the inductor is undesirably increased.

The entrance of the slope-compensated converter into current limit with the peak current in the inductor below VCLAMP produces what is known as current-limit error (i.e., the difference between the peak current in the inductor and VCLAMP at the point the converter is first in current limit). The amount of current-limit error may depend on the amount of slope compensation and the duty cycle of current application when the converter enters current limit. Thus, the peak current limit is dependent upon the amount of slope compensation and the duty cycle in slope-compensated converters.

A first of two techniques for reducing current-limit error has been to raise VCLAMP from its nominal constant level (VCLAMP0) to a higher constant level VCLAMP+ to prevent the converter from entering current limit until after the peak current in the inductor attains the level of VCLAMP0.

The disadvantage of this first technique is that it necessitates that the components including the power switch must be oversized and more expensive to handle the increase in peak current. While oversizing components may be acceptable in some instances, such oversizing is not acceptable in many applications.

A second technique has been to clamp VERROR after VSLOPE has been subtracted therefrom. A disadvantage of this technique is that there is a loss of slope-compensation as a result of the "clipped" VERROR signal. The loss of slope-compensation translates into unstable or chaotic operation of the converter when it is driven into current limit at duty cycles of 50% or greater.

SUMMARY OF THE INVENTION

Accordingly, it is an object of the present invention to provide a novel method and circuit for achieving a peak current limit in a DC/DC converter which is independent of the duty cycle of the converter.

It is another object of the present invention to provide a novel method and circuit for achieving a peak current limit in a DC/DC converter which is independent of the level of slope compensation provided by the converter.

It is yet another object of the present invention to provide a novel method and circuit which provide stable operation of a DC/DC converter over a full range of converter operation duty cycles.

It is still another object of the present invention to provide a novel method and circuit for modifying the clamping signal in a DC/DC converter.

It is a further object of the present invention to provide a novel method and circuit in which the clamping level of the error signal in a DC/DC converter is variable.

It is yet a further object of the present invention to provide a novel method and circuit for varying the clamping signal of a DC/DC converter as a function of a level of current in the converter.

It is still a further object of the present invention to provide a novel method and circuit for varying the clamping signal of a DC/DC converter as a function of the level of slope compensation used in the converter.

It is still yet another object of the present invention to provide a novel method and circuit for varying the clamping signal of a DC/DC converter as a function of the duty cycle of the converter.

These and other objects, features and advantages in accordance with the present invention are provided by a method for achieving a peak current limit in an inductor of a slope-compensated current mode DC/DC converter where the current through the inductor is controlled as a function of an error signal, and wherein the method preferably comprises the steps of: (a) clamping the error signal; and (b) modifying the voltage at which the error signal is clamped so that the peak current limit is independent of the duty cycle of the current through the inductor to reduce current-limit error which would otherwise occur from slope compensation and a fixed clamping of the error voltage. Without the modifying of the voltage at which the error signal is clamped, the slope compensation may cause the converter to enter current limit at a peak current lower than set by a fixed clamping of the error signal thereby producing the current-limit error.

In one embodiment, the modifying of the clamp for the error signal is based on a peak current through the inductor. In another embodiment, the modification is based on the average current through the inductor. In yet another embodiment, a sample and hold circuit modifies the clamping voltage on a cycle-by-cycle basis so that the clamping voltage is elevated until shortly after the converter enters current limit, at which point the clamping voltage may be reduced cycle-by-cycle.

DESCRIPTION OF PREFERRED EMBODIMENTS

Figure 4:
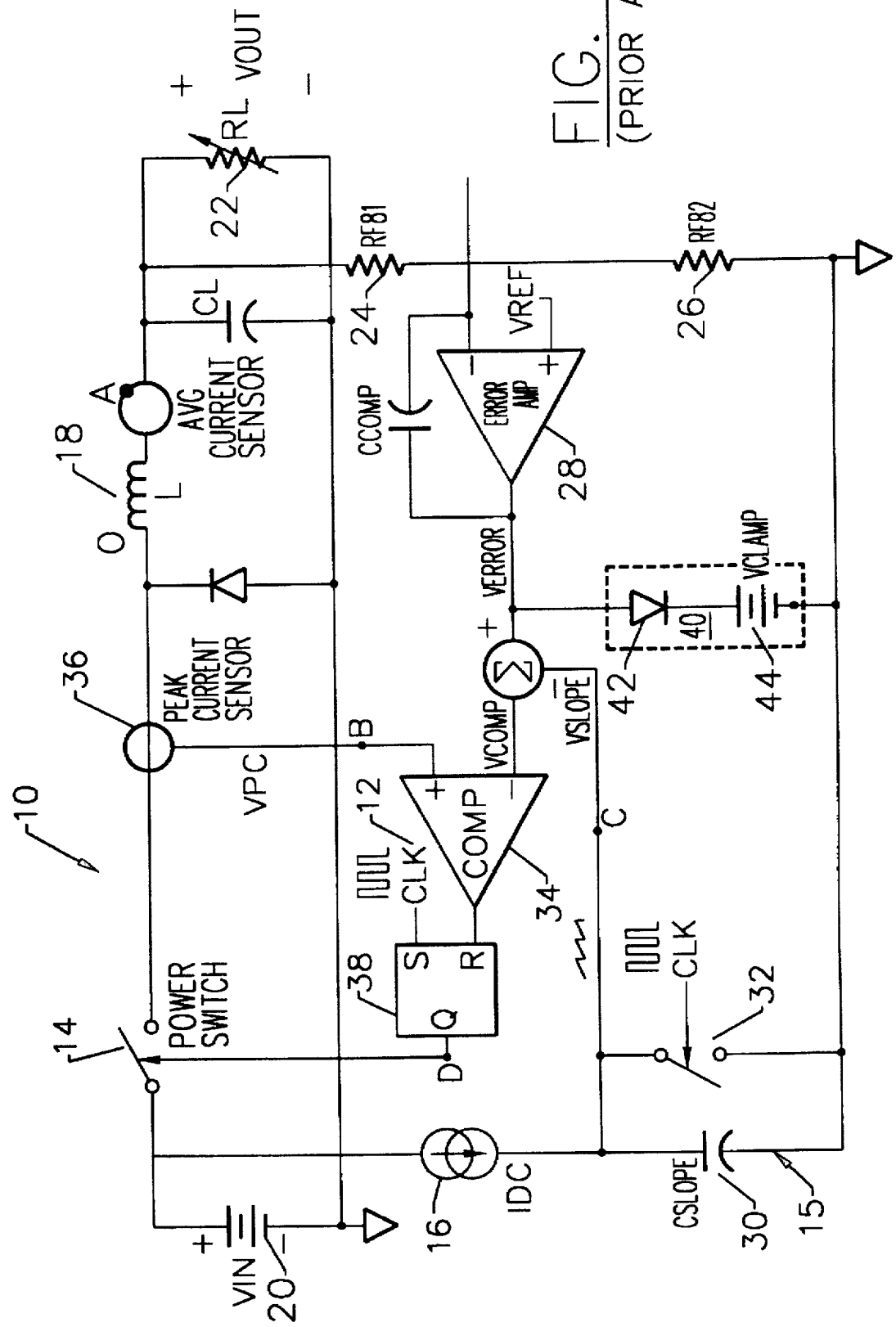
FIG. 4 is a schematic circuit diagram of a slope-compensated DC/DC converter with a clamp of VERROR.

A prior art slope-compensated DC/DC converter 10 is illustrated by way of the circuit diagram of FIG. 4. In the converter 10, a clock (not shown) provides a clock signal 12 to a high side or power switch 14 to effect the closure thereof.

Closure of the switch 14 causes current to ramp up in the inductor 18 for application to the capacitor CL which supplements the current supplied to the load RL from the inductor. A voltage divider 24,26 provides a voltage related to load voltage and the load voltage is thus compared with a reference voltage VREF in an error amplifier 28. The output signal VERROR from the amplifier 28 is increased or decreased as necessary to maintain the output voltage of the converter at the desired level.

With continued reference to FIG. 4, a current source 16 supplies a constant current to a capacitor 30 which is periodically discharged by the clock signal controlled closure of a switch 32. The resulting sawtooth waveform reflecting the charging of the capacitor 30 over time with substantially instantaneous discharge provides the slope compensation signal VSLOPE.

VERROR may be summed with VSLOPE and the slope-compensated error signal VCOMP may be applied to a comparator 34 for comparison with a voltage related to the peak current in the inductor as sensed by a sensor 36. When the peak current signal VPC equals VCOMP, the comparator 34 may generate a signal which resets the flip-flop 38 and opens the power switch 14.

Opening of the power switch 14 disconnects the inductor 18 from the source 20 and results in a ramp down of the current in the inductor 18 during the time the power switch 14 is open. Since the power switch is opened responsively to VCOMP, VCOMP limits the peak current through the inductor 18.

With continued reference to FIG. 4, the error signal VERROR may be clamped to a constant voltage level in any suitable conventional manner such as by the circuit 40 consisting of a diode 42 and a second voltage source 44.

Figure 5:
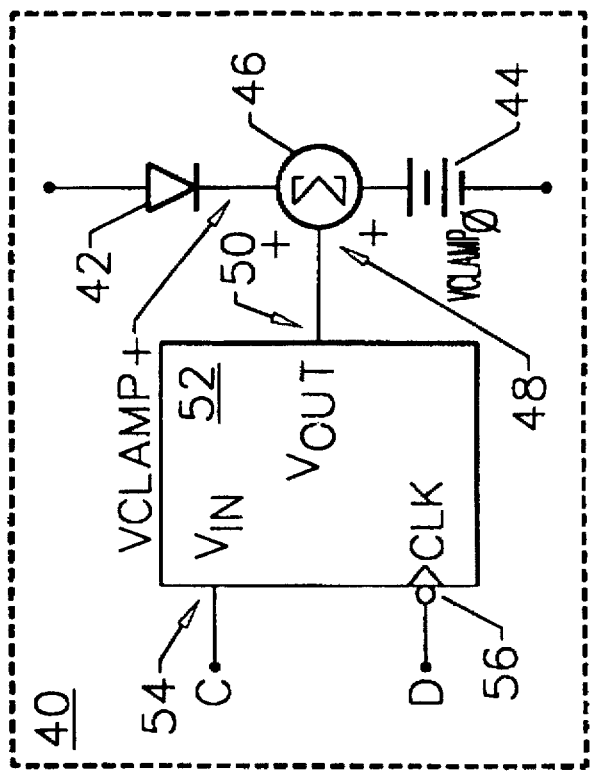
FIG. 5 is a schematic circuit diagram of one embodiment of the clamp of the present invention.

A preferred embodiment of the invention is illustrated in FIG. 5 where elements common to those of FIG. 4 have been given like numerical designations to facilitate an understanding of the present invention.

With reference to FIG. 5, the clamping circuit 40 includes the diode 42, a summing circuit 46 and the second voltage source 44 connected in series, with the output of a sample and hold device 52 connected to the summing circuit 48. As schematically illustrated in FIG. 5, the voltage on the Vin terminal 54 of the sample and hold circuit 52 is sampled at a time determined by the signal on the clock input terminal 56, and held as the output voltage until such time as the clock terminal is again toggled.

The input voltage terminal 54 of the sample and hold device may be connected to the circuit of FIG. 4 to receive the VSLOPE signal, and the clock terminal 56 connected to the flip-flop 38 so that it is toggled each time the power switch 14 is opened. Thus the voltage to which the error signal VERROR is clamped is adjusted each time the power switch 14 is opened and that voltage is held for one cycle rather than declining with time. This addition to the clamp voltage results in the raising of VCLAMP0 to VCLAMP+ and provides an offset for VSLOPE. This offset raises the clamp to the precise level needed so that current limit is entered only if peak inductor current equals the desired peak current limit VCLAMP0.

The sample and hold device 52 thus modifies the clamping voltage VCLAMP on a cycle-by-cycle basis. Since VSLOPE is generally unchanged from cycle-to-cycle, a change in the duty cycle of the converter results in a change in VCLAMP.

Figure 1:
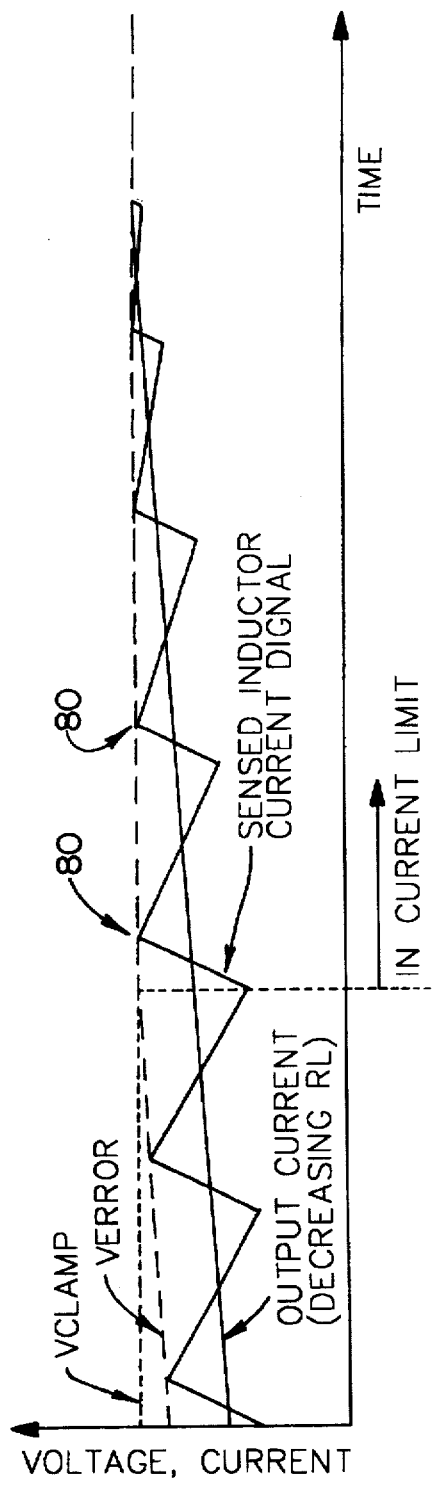
FIG. 1 is an exemplary graph of the voltage and current in the inductor of a prior art DC/DC converter showing the entry of the converter into current limit as a result of increasing load.
Figure 2:
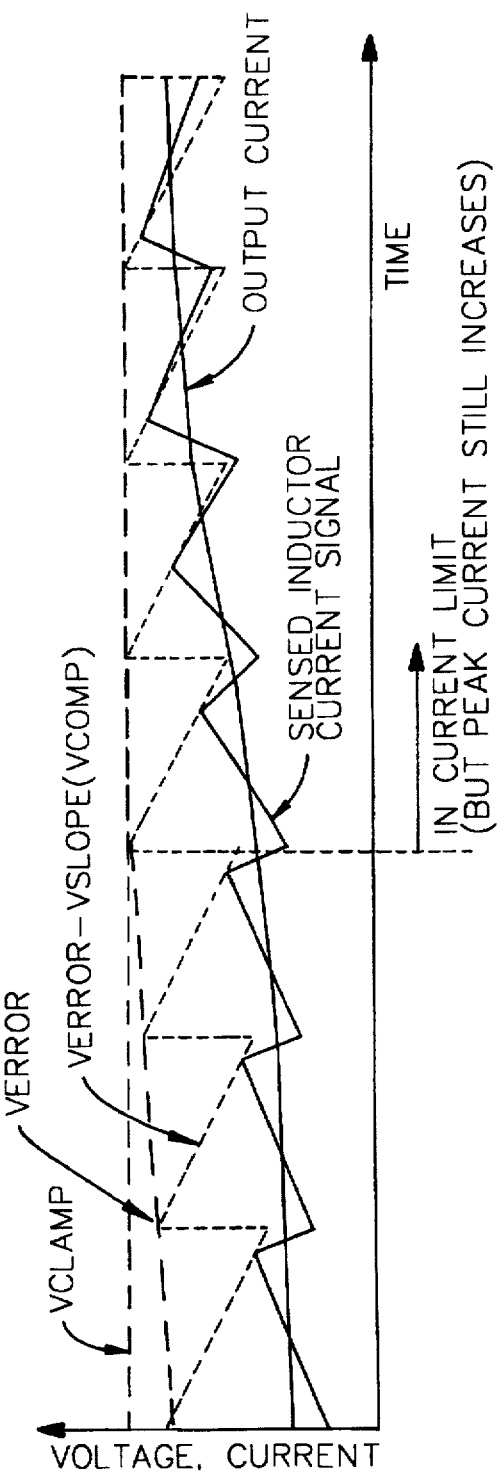
FIG. 2 is an exemplary graph of the voltage and current in the inductor of a prior art slope-compensated DC/DC converter showing the entry of the converter into current limit as a result of increasing load.
Figure 3:
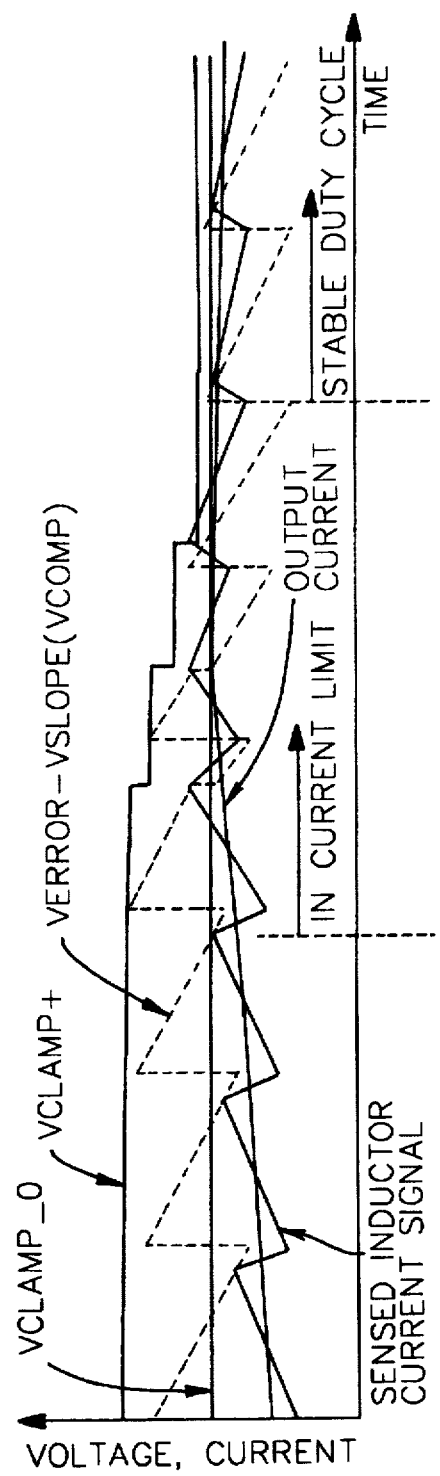
FIG. 3 is an exemplary graph of the voltage and current in the inductor of a DC/DC converter of the present invention operated in accordance with the teachings herein showing the entry of the converter into current limit as a result of increasing load.

The modification of VCLAMP is illustrated in the graph of FIG. 3. Without modification, VCLAMP would correspond with VCLAMP0. With modification, VCLAMP is elevated to VCLAMP+ until shortly after the converter enters current limit, at which point VCLAMP+ may be reduced cycle-to-cycle and approaches VCLAMP0 over time.

As a result of the modification of VCLAMP, the clamping of the error signal VERROR is such that the peak current in the inductor during current limit is both independent of the converter's duty cycle and independent of the amount of slope compensation used. Further, the clamping of VERROR using the clamp 40 of FIG. 5 does not compromise the operational stability of the converter over a full range (0-100%) of duty cycles of the current applied to the inductor 18.

Figure 6:
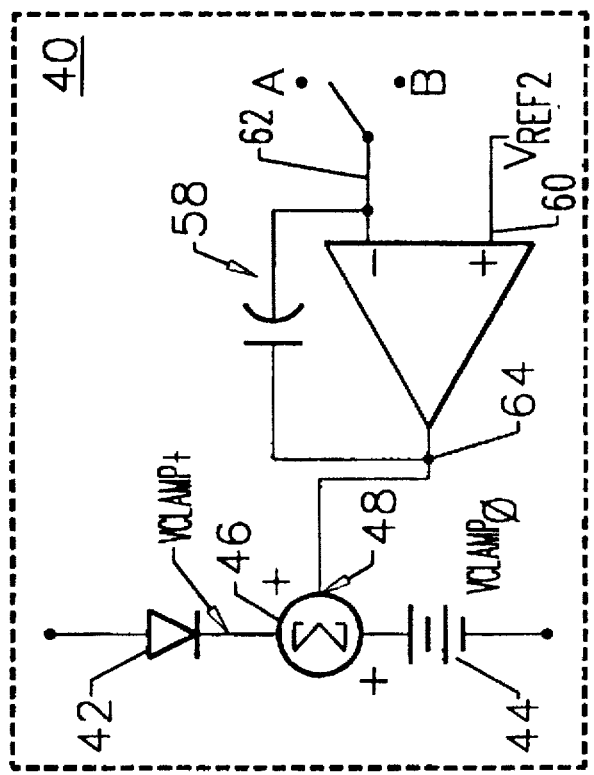
FIG. 6 is a schematic circuit diagram of a second embodiment of the clamp of the present invention.

A second embodiment of the invention is illustrated in FIG. 6, and may include the diode 42, a summing circuit 46 and the second voltage source 4 connected in series. Instead of the sample and hold circuit of FIG. 5, the clamp of FIG. 6 may further include a second error amplifier in which an unknown voltage may be compared with the voltage on a reference voltage terminal 60. The output terminal 64 may be directly connected to the summing circuit 46 to provide the correction voltage to the clamp.

The input terminal of the comparator may alternatively be connected to node A or to node B in the circuit of FIG. 4. Connection of the input terminal 62 to node A provides a voltage related to the average current in the inductor 18 at the input terminal 62, and connection of the input terminal 62 to node B provides a voltage related to the peak current in the inductor 18. The clamp of FIG. 6 may operate with either average current or peak current values so long as the reference voltage is adjusted appropriately.

While preferred embodiments of the present invention have been described, it is to be understood that the embodiments described are illustrative only and the scope of the invention is to be defined solely by the appended claims when accorded a full range of equivalence, many variations and modifications naturally occurring to those of skill in the art from a perusal hereof.

What is claimed is:

1. In a slope-compensated current mode DC/DC converter where the current through the inductor is controlled as a function of an error signal, the method of achieving a peak current limit for the inductor comprising the steps of:
   (a) clamping the error signal; and
   (b) modifying the voltage at which the error signal is clamped so that the peak current limit is independent of the duty cycle of the current through the inductor to reduce current-limit error which would otherwise occur from slope compensation and fixed clamping of the error signal.

2. The method of claim 1 wherein the voltage at which the error signal is clamped is modified as a function of the peak current through the inductor.

3. The method of claim 1 wherein the voltage at which the error signal is clamped is modified as a function of the average current through the inductor.

4. The method of claim 1 wherein the voltage at which the error signal is clamped is modified as a function of the duty cycle of the converter.

5. The method of claim 1 wherein the voltage at which the error signal is clamped is modified as a function of the slope compensation used in the converter.

6. The method of claim 1 wherein the voltage at which the error signal is clamped is modified as a function of the duty cycle and the slope compensation of the converter.

7. The method of claim 1 wherein the step of modifying comprises summing a correction voltage with the voltage at which the error signal is clamped.

8. The method of claim 7 wherein the correction voltage is generated by a sample and hold circuit.

9. The method of claim 8 wherein a slope compensation signal is applied to the sample and hold circuit.

10. The method of claim 9 wherein the sample and hold circuit samples and holds the level of the slope compensation signal at the time the peak current limit is achieved in the inductor.

11. The method of claim 7 wherein the correction voltage is generated by an error amplifier.

12. The method of claim 11 wherein a signal related to peak current in the inductor is applied to the error amplifier.

13. The method of claim 11 wherein a signal related to average current in the inductor is applied to the error amplifier.

14. The method of claim 1 wherein the step of modifying comprises initially increasing the voltage at which the error signal is clamped and decreasing the voltage at which the error signal is clamped after the converter is in current limit.

15. The method of claim 1 wherein the step of modifying comprises increasing the voltage to which the error signal is clamped to the level at which the sensed peak current attains the desired peak current in the inductor.

16. In a DC/DC converter having an inductor supplied with current through the operation of a switch in series with a source of current, a method of providing a slope-compensated error voltage for limiting the peak current in the inductor comprising the steps of:
   (a) comparing a voltage related to the output voltage of the converter with a reference voltage to thereby provide an error voltage;
   (b) clamping the error voltage to a clamping voltage related to the peak current for which the converter is rated;
   (c) compensating the clamped error voltage to provide a slope-compensated error voltage and stable operation of the converter; and
   (d) modifying the clamping voltage as a function of the change in the duty cycle of the converter to reduce current-limit error which would otherwise occur from slope compensation and fixed clamping of the error signal.

17. The method of claim 16 wherein the step of modifying comprises summing a voltage related to the peak current in the inductor with the clamping voltage.

18. The method of claim 16 wherein the step of modifying comprises summing a voltage related to the average current through the inductor with the clamping voltage.

19. The method of claim 16 wherein the step of modifying comprises the steps of:
   i) sampling a slope compensation signal at the time the switch is opened to disconnected the current source from the inductor, and
   ii) summing the sampled voltage with the clamping voltage until such time as the switch is next opened.

20. In a slope-compensated current mode DC/DC converter where the current through the inductor is limited as a function of an error signal, the method of achieving a predetermined peak current limit for a full range of duty cycles comprising the steps of:
   (a) clamping the error signal; and
   (b) modifying the voltage at which the error signal is clamped as a function of duty cycle so that the predetermined peak current limit is achieved independent of the particular duty cycle in the full range under which the converter is operating to reduce current-limit error which would otherwise occur from slope compensation and fixed clamping of the error signal.

21. In a slope-compensated current mode DC/DC converter where the current through the inductor is controlled as a function of an error signal, the method of achieving a peak current limit for the inductor comprising the steps of:

(a) clamping the error signal; and (b) modifying the voltage at which the error signal is clamped so that the peak current limit is independent of the amount of slope compensation used in the converter to reduce current-limit error which would otherwise occur from slope compensation and fixed clamping of the error signal.

22. In a slope-compensated current mode DC/DC converter having an inductor, the peak current limit for which is a function of a clamping signal, the improvement comprising means for selectively modifying the clamping signal to reduce current-limit error which would otherwise occur from slope compensation and fixed clamping of the error signal.

23. The converter of claim 22 wherein said modifying means is responsive to the peak current through the inductor.

24. The converter of claim 22 wherein said modifying means ms responsive to the average current through the inductor.

25. The converter of claim 22 wherein said modifying means is responsive to the duty cycle of the converter.

26. The converter of claim 22 wherein said modifying means is responsive to the slope compensation used in the converter.

27. The converter of claim 22 wherein said modifying means includes a sample and hold circuit.

28. The converter of claim 22 wherein said modifying means includes an error amplifier having a predetermined reference voltage.

29. In a DC/DC converter having an inductor supplied with current through the operation of a switch in series with a source of current, means for providing a slope-compensated error voltage for limiting the peak current in the inductor comprising:

(a) means for comparing a voltage related to the output voltage of the converter with a reference voltage to thereby provide an error voltage;

(b) means for clamping the error voltage to a clamping voltage related to the peak current for which the converter is rated;

(c) means for slope compensating the clamped error; and (d) means for modifying the clamping voltage as a function of the change in the duty cycle of the converter to reduce current-limit error which would otherwise occur from slope compensation and fixed clamping of the error signal.

30. The converter of claim 29 wherein said means for modifying is responsive to peak current in the inductor.

31. The converter of claim 30 wherein said means for modifying comprises means for summing a voltage related to the peak current in the inductor with the clamping voltage.

32. The converter of claim 29 wherein said means for modifying is responsive to average current in the inductor.

33. The converter of claim 32 wherein said means for modifying comprises means for summing a voltage related to the average current in the inductor with the clamping voltage.

34. The converter of claim 29 wherein the means for modifying comprises:

i) means for sampling a slope compensation signal at the time the switch is opened to disconnected the current source from the inductor, and ii) means for summing the sampled voltage with the clamping voltage until such time as the switch is next opened.

* * * * *